(No Model.)
M. FLAMMANG.
SHUTTER FOR PHOTOGRAPHIC CAMERAS.
No. 258,199. Patented May 16, 1882.
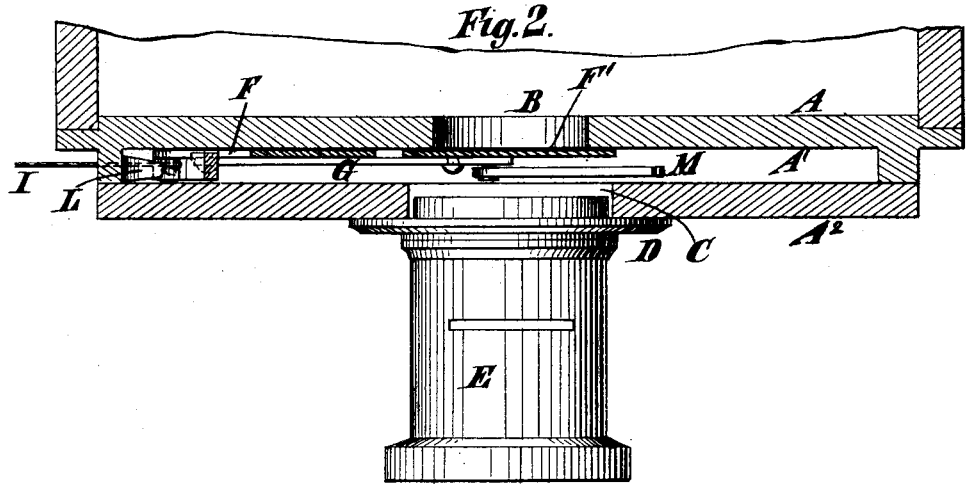
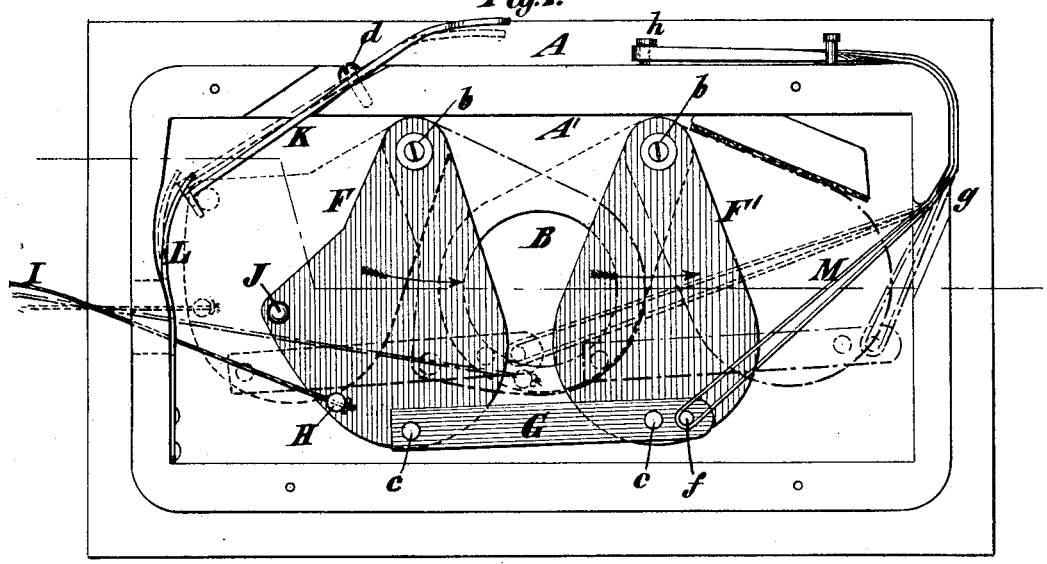
Witnesses
T. H. Keane
James R. Bowen.
Inventor
Mathias Flammang
By his Atty
Edwin H. Brown.

UNITED STATES PATENT OFFICE.

MATHIAS FLAMMANG, OF NEWARK, NEW JERSEY.

SHUTTER FOR PHOTOGRAPHIC CAMERAS.

SPECIFICATION forming part of Letters Patent No. 258,199, dated May 16, 1882.

Application filed December 28, 1881. (No model.)

*To all whom it may concern:*

Be it known that I, MATHIAS FLAMMANG, of Newark, in the county of Essex and State of New Jersey, have invented new and useful Improvements in Shutters for Photographic Cameras, of which the following is a specification.

The object of my present improvement is to produce a simple and compact shutter for a photographic camera to adapt the camera for use in instantaneous photography.

To this end my improvements consist in the combination, with an opening which occupies, or is adapted to occupy, a position opposite the lens-tube, of two shutters pivoted independently to a support, and means connected with said shutters for moving them upon their pivots over and past the said opening.

They also consist in the combination, with an opening which occupies, or is adapted to occupy, a position opposite the lens-tube, of two shutters pivoted independently to a support and a connection between the shutters.

They also consist in the combination, with an opening which occupies, or is adapted to occupy, a position opposite the lens-tube, of two shutters pivoted independently to a support, a connection between the shutters, means for moving said shutters in one direction, and a spring for moving them in the opposite direction.

They also consist in the combination, with an opening which occupies, or is adapted to occupy, a position opposite the lens-tube, of two shutters connected independently to a support, a connection between the shutters, means for moving said shutters in one direction, a catch for holding the shutters in a certain position, and a spring for moving the shutters in the opposite direction when the catch is made to release it.

They also consist in the combination, with an opening in the front of a camera, of two shutters pivoted independently thereto rearward of the face, means connected with said shutters for moving them upon their pivots in one direction, and a spring for moving them in the opposite direction.

In the accompanying drawings, Figure 1 is a front view of a photographic camera front embodying my improvements, and Fig. 2 is a horizontal section thereof and top view of the lens-tube.

Similar letters of reference designate corresponding parts in both figures.

A designates the front of a photographic camera. It is provided with or comprises a box, A', at the forward side, and this box has a removable cover, $A^2$, which may be secured in place by screws $a$, or otherwise. In the rear side of the middle portion of the front A is an opening, B, and in the cover $A^2$ is a corresponding opening, C. On the other side of the cover $A^2$ is a screw-socket, D, in which the lens-tube E of the camera may be detachably secured.

F F' designate two shutters, which, as here shown, have rounded ends and taper from one end to the other. At the smaller ends they are pivoted by screws $b$ or equivalent means within the box A', one at each side of the openings B C.

G designates a rod pivoted by pins $c$ to the larger ends of the shutters, and forming a connection between them.

H designates a pin extending from the shutter F. This pin may extend through an arc-shaped slot in the cover $A^2$ and serve as a handle, whereby the two shutters may be retracted, so as to set them; but, as here shown, it has attached to it a string, I, which extends through the side of the box A', where it may be conveniently manipulated.

J designates a stud or projection on the shutter F, and K designates a lever having a hooked inner end, with which said stud or projection engages when the shutters are retracted. This lever extends through an oblique slot in one of the walls of the box A', and is fulcrumed by a screw, $d$, in such manner that it may be oscillated in a plane parallel with the cover of the said box. A spring, L, acting against the inner end of the lever, impels it inward, so as to adapt its hook to engage with the stud or projection J when the shutters are retracted. When the said stud or projection thus engages with the lever the shutters are set. By pressing on the outer end of the lever its inner end is disengaged from the stud or projection J, and the shutters are then free to fly back to their normal position under the influence of the means employed to accomplish this result. As here shown, these means consist of a spring or india-rubber strap, M, which is slipped over a pin, $f$, on the rod G, passed thence through a slot, $g$, in one of the walls of the box, and slipped onto a pin, $h$, on the outside of the box.

It will be seen that I produce shutters for a camera which adapt it admirably for use in instantaneous photography, and, moreover, that the shutters are concealed within the box in which they are arranged. If desirable, the shutters and their appurtenances might be applied to a box adapted to be fastened to the outer end of the lens-tube of the camera. In this case the front of the camera would be made in the ordinary manner.

What I claim as my invention, and desire to secure by Letters Patent, is—

1. The combination, with an opening which occupies, or is adapted to occupy, a position opposite the lens-tube of a photographic camera, of two shutters pivoted independently to a support, and means connected with said shutters for moving them upon their pivots over and past the said opening, substantially as specified.

2. The combination, with an opening which occupies, or is adapted to occupy, a position opposite the lens-tube of a photographic camera, of two shutters pivoted independently to a support and a connection between the shutters, substantially as specified.

3. The combination, with an opening which occupies, or is adapted to occupy, a position opposite the lens-tube of a photographic camera, of two shutters pivoted independently to a support, a connection between the shutters, means for moving said shutters in one direction, and a spring for moving them in the opposite direction, substantially as specified.

4. The combination, with an opening which occupies, or is adapted to occupy, a position opposite the lens-tube of a photographic camera, of two shutters pivoted independently to a support, a connection between the shutters, means for moving said shutters in one direction, a catch for holding the shutters in a certain position, and a spring for moving the shutters in the opposite direction when the catch is made to release it, substantially as specified.

5. The combination, with an opening in the front of a camera, of two shutters pivoted independently thereto rearward of the face, means connected with said shutters for moving them upon their pivots in one direction, and a spring for moving them in the opposite direction, substantially as specified.

M. FLAMMANG.

Witnesses:
T. J. KEANE,
GEORGE H. BOTTS.